UNITED STATES PATENT OFFICE.

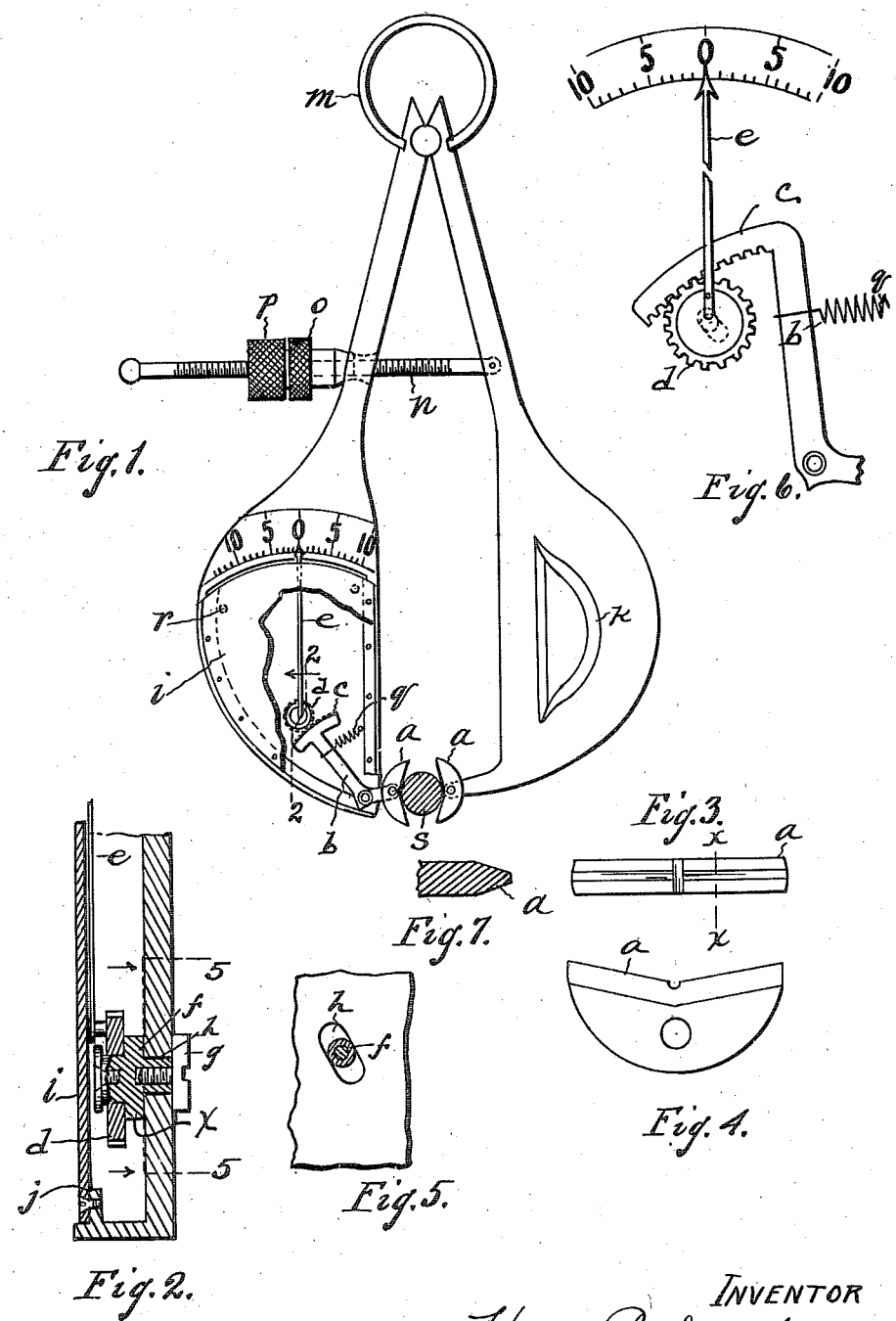

HARRY B. DOUGLASS, OF DETROIT, MICHIGAN.

INDICATING-CALIPERS.

1,305,701.  Specification of Letters Patent.  Patented June 3, 1919.

Application filed March 17, 1919. Serial No. 283,145.

*To all whom it may concern:*

Be it known that I, HARRY B. DOUGLASS, a citizen of the United States, residing at Detroit, county of Wayne, State of Michigan, have invented a new and useful Improvement in Indicating-Calipers, of which the following is a specification.

This invention relates to calipers adapted to measure variations in thickness or diameters. It comprises a pair of calipers equipped with a pair of sensitive contact pieces responsive to the least variations and which register such variations on a dial through the instrumentality of an amplifier.

One of the objects of the invention is to provide an amplifying indicator which requires no spring to adjust in order to insure the amplifying means working with precision. A movable pivot is provided for the dial hand that enables the member carrying the dial hand to be adjusted into accurate engagement with the actuating member.

This indicator is combined with a pair of pivoted contact pieces which are arranged to find the center line of a member of circular cross section so that accurate measurements can be taken of the diameter with very little trouble. These features will more fully appear in the specification.

In the drawings,—

Figure 1 is an elevation of a pair of calipers provided with a variation indictor and amplifier.

Fig. 2 is a section on the line 2—2 of Fig. 1.

Figs. 3 and 4 are details of the V-faced contact pieces of the caliper feet.

Fig. 5 is a section on the line 5—5 of Fig. 2.

Fig. 6 is an enlarged detail showing a modified form of indicator amplifier.

Fig. 7 is a section on the line X—X of Fig. 3.

Indicators which comprise a spring-pressed stem projecting outwardly from a case provided with a dial and a pointer are in common use to measure variations. However, these indicators are not very suitable and, in fact, not absolutely accurate in measuring diameters because they cannot be suitably manipulated. Calipers provided with variation indicators are also broadly old but these heretofore designed either lack precision or else are a source of considerable trouble in keeping them in accurate adjustment. They depend upon the use of a spring to keep the actuator and the actuated elements of the amplifier in precise engagement. They also are not provided with means for finding a diameter on a member of circular cross section.

I employ a pair of V-faced contact pieces $a, a$ pivotally supported on the ends of the caliper arms, one on a fixed pivot and the other on a movable pivot which is part of the lever $b$ of the amplifier. The amplifier comprises this lever $b$ having at its other end a toothed segment $c$ meshing with the pinion $d$ which carries the pointer $e$. These gear teeth can be very nicely made and caused to accurately mesh. Note that the pivot $f$ which carries the pinion $d$ is provided with a collar $x$ and a set screw $g$ so it may be moved and adjusted toward or away from the segment $c$ radially to the center of the segment in the slot $h$ (Fig. 5). The teeth of the pinion and the segment can be very accurately cut and the slot and movable pivot arrangement for the pinion enable all slack to be taken out of the teeth so that there is no lost motion between the segment and the pinion.

It will be apparent from viewing the lever $b$ that the movement of the power arm is multiplied nearly three times that of the resistance arm, and similarly it will be evident that the movement of the resistance arm of the pointer and pinion parts of the amplifier will be seven or eight times that of the power arm. Hence the multiplication of movement in the pinion and pointer is seven or eight to one and inasmuch as this is actuated by the actuating lever, which has a multiplying ratio of about three to one, the final amplification will be somewhere in the neighborhood of twenty to one, depending altogether upon the exact lengths of the resistance arms and the power arms on the two levers. This will enable variations of as small as 1/1000ths of an inch to appear on the dial and movements of 1/50th of an inch or greater, which are easily visible to the eye.

In Fig. 6 I have shown the preferred form of pinion and segment. This is an internal gear segment and pinion operating precisely in the same way but has the advantages of amplifying to a greater extent and a greater number of teeth of the segment will mesh with the teeth of the pinion.

The amplifying devices are covered up by a plate $i$ which seats on the ledge $j$ of the housing formed on the leg of the caliper. The weight $k$ is provided on the other leg of the caliper as a counterbalancing weight to balance the added parts that the indicator adds to the other leg so that the calipers are in substantial balance.

The ends of the calipers are provided with a spring ring $m$ which tends to keep the calipers spread as is quite common with this type of caliper. The screw $n$, adjusting nut $o$ and lock nut $p$ serve to fix the amount of spread of the calipers.

The operation of the calipers is as follows: The small pull spring $q$ pulling on the lever $b$ will tend to move the pointer $e$ against the stop $r$. This will be the normal position of the pointer. When a measurement is to be taken of the thickness of a piece of work which is designated $s$, and which is circular in cross section, the pair of V-faced contact pieces are brought against the outside sides of the work. These V-faced contact pieces being pivoted and being always adapted to have each a two-point contact with a circular member, will always take a position on the center line of a member having a circular cross section, for only in such position can they have a four-point contact with a member having a circular cross section. The spring $q$ urges them to such a four-point contact as will now be explained. The pointer $e$ is over against the stop $r$ when the calipers are not applied to the job; the calipers are now caused to straddle the work; the adjusting nut $o$ is screwed down on the screw $n$ until the V-faced contact pieces $a$ strike the work; the spring $q$ causes them to seek a four-point contact with the work of circular cross section and when this is achieved they are on the center line; the nut $o$ is continued to be screwed down until the pointer moves along to the zero position; the instrument is then set for the work. By moving the calipers along the work, if it is a cylindrical piece, the spring $q$ will cause the contact pieces to follow the work.

If there are any variations above or below the diameter at which the calipers have been set, it is immediately indicated. By turning the calipers on the work or turning the work in the calipers any variations from a true circle will be indicated on the dial. This is an indication that cannot accurately be achieved by the ordinary single stem indicator. The instrument is very useful for accurate measurement while the work is revolving and being worked upon.

What I claim is:

1. Indicating calipers, having in combination, a pair of caliper arms, a lever pivoted near one of the ends of the caliper arms having a gear segment at one end, a pinion meshing with said gear segment, and a pointer attached to the pinion.

2. Indicating calipers, having in combination, a pair of caliper arms, a lever pivoted near the end of one of the caliper arms having at its inner end a gear segment, a pinion mounted on an adjustably movable pivot, and meshing with the gear segment, said pinion adjustable to and away from the gear segment, and a pointer attached to the pinion.

3. Indicating calipers, having in combination, a pair of caliper arms provided with graduations on one of the arms, an amplifying indicator supported on one of the caliper arms and including a pointer and a spring for swinging the pointer normally to one end of the graduations over which it runs, means for yieldingly spreading the caliper arms, and means for contracting the caliper arms to the work and bringing the pointer to zero, whereby the amplifier spring causes the contact pieces of the indicator to follow the work.

4. Indicating calipers, having in combination, a pair of caliper arms, a variation indicator and amplifier carried on one of the arms and including therein a V-faced contact piece pivotally supported at its end, the other caliper arm being provided with a pivoted V-faced contact piece and means for yieldingly swinging one of the contact pieces toward the work.

5. Indicating calipers, having in combination, a pair of caliper arms, a pair of pivotally supported V-faced contact pieces on the ends of the caliper arms, an amplifying lever and pointer connected with one of the contact pieces, a spring therefor tending to swing the amplifying devices to the limit of their movement in one direction, and means for adjusting the calipers down upon the work for causing the contact pieces to contact with the work.

6. Indicating calipers, having in combination, a pair of caliper arms provided with graduations on one of the arms, means for yieldingly spreading the same, a screw and nut adjustment for contracting the calipers against the action of the spring, a pair of V-faced contact pieces pivotally supported at the ends of the caliper arms, indicating and amplifying means supported on one of the caliper arms and having connection with the contact piece of that arm and including a spring which tends to swing the indicating means to one end of the graduations until the contact pieces are adjusted to the work, whereupon the spring serves to cause the contact pieces to contact with the work.

7. Indicating calipers, having in combination, a pair of caliper arms, pivotally-supported V-faced contact pieces, one on the end of each caliper arm, means for yieldingly forcing one of these V-faced contact members toward the work and means for indicating any small movement thereof.

8. Indicating calipers, having in combination, a pair of caliper arms, a contact piece with a V-face pivotally supported on one caliper arm, an indicating lever swingingly supported on the other caliper arm and having pivotally supported on its end a companion V-faced contact piece, and a spring for yieldingly swinging the lever and causing the contact piece supported thereon to contact with the work.

In witness whereof I have hereunto set my hand on the 12th day of March, 1919.

HARRY B. DOUGLASS.